US007954120B2

(12) United States Patent
Roberts et al.

(10) Patent No.: US 7,954,120 B2
(45) Date of Patent: May 31, 2011

(54) ANALYSING VIEWING DATA TO ESTIMATE AUDIENCE PARTICIPATION

(75) Inventors: Andrew Clive Roberts, London (GB); Mark Adrian Wheatley, Maidenhead (GB); Peter Wilcox, Gerrards Cross (GB)

(73) Assignee: Taylor Nelson Sofres, PLC, London (GB)

( * ) Notice: Subject to any disclaimer, the term of this patent is extended or adjusted under 35 U.S.C. 154(b) by 1268 days.

(21) Appl. No.: 10/960,643

(22) Filed: Oct. 7, 2004

(65) Prior Publication Data

US 2006/0075421 A1 Apr. 6, 2006

(51) Int. Cl.
*H04N 7/16* (2006.01)
*H04H 60/32* (2008.01)
*H04H 60/33* (2008.01)

(52) U.S. Cl. .......... 725/12; 725/14

(58) Field of Classification Search .......... 725/9, 14, 725/29

See application file for complete search history.

(56) References Cited

U.S. PATENT DOCUMENTS 6,025,869 A * 2/2000 Stas et al. .......... 725/28
6,467,089 B1 10/2002 Aust et al.
6,684,194 B1 * 1/2004 Eldering et al. .......... 705/10
6,701,523 B1 * 3/2004 Hancock et al. .......... 725/25
6,813,775 B1 * 11/2004 Finseth et al. .......... 725/46
7,039,928 B2 * 5/2006 Kamada et al. .......... 725/9
7,260,823 B2 * 8/2007 Schlack et al. .......... 725/9
2002/0083435 A1 6/2002 Blasko et al.
2003/0131350 A1 7/2003 Peiffer et al.

FOREIGN PATENT DOCUMENTS

WO WO 01/65747 9/2001

* cited by examiner

*Primary Examiner* — Scott Beliveau
*Assistant Examiner* — Bennett Ingvoldstad
(74) *Attorney, Agent, or Firm* — Greer, Burns & Crain, Ltd.

(57) ABSTRACT

According to the present invention there is provided a method of analysis of the audience for channels selectable by a channel selector device for presentation on a presentation device, the channel selector device providing data indicating which channels are selected and the lengths of time for which selected channels remain selected. The data relating to the lengths of time for which channels remain selected is subject to a capping procedure, whereby the indicated length of time for which a channel remains selected is reduced to a capped maximum permitted length of time if the indicated length of time exceeds the maximum permitted length, to provide capped data. The capped data is employed to select, in dependence upon the indication of the channel selected and length of time for which the channel is selected, an array of probabilities of individuals' exposure (PIVs) to the presentation of the channel on a presentation device, for individuals of different demographies, whereby the data provided by the channel selector device can be resolved into data estimating the likelihood of individuals of different demographies participating in the audience.

2 Claims, 12 Drawing Sheets

Fig. 2 : Distribution of length of viewing sessions

Fig. 3 : Average Homes Rating (all viewing) by Daypart

Fig 4 : Average Homes Rating (all viewing) by Daypart

ANALYSING VIEWING DATA TO ESTIMATE AUDIENCE PARTICIPATION

FIELD OF THE INVENTION

The present invention relates to audience analysis, for example the analysis of the audience viewing television in the home.

BACKGROUND OF THE INVENTION

Traditional TV audience measurement/analysis systems make use of so-called "people meters" installed in a panel of households, chosen such that their occupants are demographically representative of the population as a whole. This technique is robust when analysing the audience to major channels by major demographic groupings (all men or all housewives for example). However, the widespread introduction of multi-channel program services, for reception via digital cable and/or satellite for example, and thus the availability of many channels, including minority-interest channels, has created a need for improved audience measurement/analysis system which can reliably analyse the audience even to minority-interest channels, and in particular can provide analysis by more specific demographic groupings (such as females aged 16 to 24). Using the traditional analysis system for this would require, to provide reliable minority channel/specific demographics, a very large "people meter" panel size, which in practice would become unaffordable.

The inventors have had the insight that the very change that causes the problem—the widespread introduction of multi-channel program services, for reception via digital cable and/or satellite for example—also offers the potential for a solution of the problem.

As is well known, digital program receivers such as digital satellite receivers and cable boxes (hereafter Set Top Boxes or STBs) can usually transmit data back to the system operator, typically either via the "back channel" of the cable system or via a telephone line connection. This feature is primarily provided to allow interactive TV services to be implemented, including for example pay-per-view. Such STBs can also run software applications, pre-loaded in the STBs or downloaded over the cable or over the air to the STBs. Typically these would be games or "infomercials". However, it has been appreciated by the inventors that it is also possible to pre-load, for example as firmware, or download software to STBs that can record, and then transmit back to the system operator, details of the channels selected from time to time by the viewer. It has further been appreciated by the inventors that since the incremental cost of doing this is very low, it can be done for a very large number of STBs; if necessary for the whole subscriber base of households using the STBs of a system operator or service provider.

The inventors have had the insight that such data can form part of the information needed to generate audience figures and carry out audience analysis. Because of the potentially very large sample size, the data offers the prospect of providing audience measurement/analysis based on data from a far greater number of households than is feasible with traditional panel systems.

However, the inventors have had the insight that such data from STB's is of itself insufficient to allow detailed audience analysis, such as analysis in relation to minority channels and small demographic groupings, to be carried out.

One issue identified by the inventors is that the STB data does not reveal when the TV to which the STB is connected was switched on and off. STBs are very typically left on permanently, so at the end of a viewing session the TV may be switched off but the STB continues to be tuned to the last channel watched. This means that channel viewing data from STB's provides, or almost certainly provides, a false indication of actual viewing of the TV. The integrity or value of the STB viewing data, even as household viewing information, is impaired.

Another issue is that such data from STB's only provides household viewing information, i.e. it indicates only the STB channel selected at each point in time. It does not reveal which individuals were watching at the relevant times.

SUMMARY OF THE INVENTION

Thus, an aspect of the present invention is concerned with the problem which results when the presentation device, for example a TV, may be switched off even though the channel selector device, for example an STB, remains on and continues to provide channel selection information.

According to the present invention there is provided a method of analysis of the audience for channels selectable by a channel selector device for presentation on a presentation device, the channel selector device providing data indicating which channels are selected and the lengths of time for which selected channels remain selected, the method comprising:

subjecting the data relating to the lengths of time for which channels remain selected to a capping procedure, whereby the indicated length of time for which a channel remains selected is reduced to a capped maximum permitted length of time if the indicated length of time exceeds the maximum permitted length, to provide capped data.

In accordance with the invention, respective capped maximum permitted lengths of time may be provided for each selectable channel, or possibly for respective groups of selectable channels, so that different capped maximum permitted lengths can be applied to data relating to different channels or different channel groups. Further, respective capped maximum permitted lengths of time may be provided for each selectable channel or channel group for different time of day periods and/or different days of the week, so that different capped maximum permitted lengths can be applied to data relating to different time of day period and/or days of the week.

An embodiment of the present invention, where the channel selector device is an STB and the presentation device a TV, can rely on STB data from multiple households, which may be a very large number of housholds or even a complete subscriber base, to generate what can be said to be the equivalent of homes viewing data normally obtained by metering TV set(s) in the households. This is achieved by dealing with instances when the TV set has been switched off but the STB has been left on, as may happen when the household has been viewing at breakfast time and the TV set, but not the STB, is turned off when people leave to go to work, or the similar situation that may occur at the end of the day when people go to bed.

The present invention overcomes this problem without the need for the TV viewing members of a household to change their behaviour, i.e. always remember to turn off the STB at the same time as the TV, and without the need for additional technical means in the household such as would ensure that the STB is turned off when the TV is turned off.

An aspect of the present invention is concerned with the problem that the channel selection information from the channel selector device, for example an STB, provides only household viewing information; that is, only information about the channel selected, for example the cable or satellite TV channel to which the STB is tuned, but provides no viewing information concerning individuals.

According to the present invention there is provided a method of analysis of an audience for channels selectable for presentation on a presentation device by a channel selector device, the channel selector device providing data indicating which channels are selected and the lengths of time for which selected channels remain selected, the method comprising:

employing the data to select, in dependence upon the indication of the channel selected and length of time for which the channel is selected, an array of probabilities of individuals' exposure (PIVs) to the presentation of the channel on a presentation device, for individuals of different demographies, whereby the data provided by the channel selector device can be resolved into data estimating the likelihood of individuals of different demographies participating in the audience.

In accordance with the present invention the data may be employed to select the array of PIVs in dependence also upon one or more additional parameters applicable to the data, beyond the channel selected and the length of time, the additional parameters being, for example, a time of day period to which the data relates, a day of the week to which the data relates An embodiment of the present invention, where the channel selector device is an STB and the presentation device a TV, can provide audience estimates for individuals based audiences by demographic classes or groups (e.g. adults aged 16-34), allowing household viewing to be effectively attributed to individual household members.

It can be said that in the aspects of the invention as set out above, raw data obtained from the channel selector devices, for example STBs, is subject to methodical manipulation, to enhance the audience analysis value and utility of the data. The methodical manipulation may be carried out in a data processor at service provider or system operator facilities, from which channels are delivered to the STBs and to which the raw data is returned via the relevant back channel of the system, or may be carried out at audience analysis facilities to which the raw data is delivered by the service operator. Typically, the data processor is a programmed computer.

The present invention extends to computer programs for carrying out the methods of the invention, media carrying or storing such programs, and computers programmed to act as data processors to carry out the methods of the invention.

Aspects or parameters of the methodical manipulation of data provided in accordance with the present invention may best be derived on the basis of "real world" reference information concerning the habits of members of the audience concerned, although it is also possible to use default functions or parameters. This means that, for achieving better or best results in accordance with the invention, it is advantageous to obtain reference information which preferably reflects as accurately as possible the behaviours or habits of audience members.

A further aspect of the present invention provides a system comprising a presentation device operable to present a channel selected by a channel selector device, the channel selector device providing data indicating which channels are selected and measurements of lengths of time for which selected channels remain selected, and further comprising a detector operable to detect whether the presentation device is on and operative to present a channel selected for presentation thereon, and to provide data indicating when the presentation device is on, and a reference information generator operable to generate indications of differences between measurements of lengths of time for which channels are selected as provided by the channel selector device and measurements of lengths of time for which the presentation device is on and operative to present the channels, as provided by the detector, whereby periods of time for which channels are selected by the channel selector device but the presentation device is off and not operative to present channels can be determined.

In this way it is advantageously detected when the presentation device, for example a TV, is switched off whilst the channel selector device, for example an STB, remains on and continues to provide channel selection information, thereby providing "real world" reference information concerning the behaviour of audiences in this respect, from which capped maximum permitted lengths of time can be derived.

In such a system in accordance with the invention, wherein the detector comprises a transmitter operable to transmit the data indicating when the presentation device is on, the system may further comprise an audience participation recognition device or "tag" capable of being carried by an individual, the recognition device having a receiver operable to receive data transmitted by the detector device and a memory operable to store the received data. The information from the "tag", providing indications of audience participation of viewing by individual audience members, and when the presentation device or TV is on, affords—in combination with the data from the channel selector device or STB—reference information concerning individuals viewing habits which can form the basis of PIV arrays.

Alternatively, in such a system in accordance with the invention, there may be provided an audience participation recognition device or "tag" capable of being carried by an individual, the recognition device having a transmitter operable to transmit a recognition device identifier, the detector device comprising an receiver operable to receive the transmitted recognition device identifier and a memory operable to store the received recognition device identifier and data indicating when the identifier was received by the detector device. The information then available from the detector, providing indications of audience participation of viewing by individual audience members as transmitted by "tags", and when the presentation device or TV is on, affords—in combination with the data from the channel selector device or STB—reference information concerning individuals viewing habits which can form the basis of PIV arrays.

DETAILED DESCRIPTION

Figure 1:
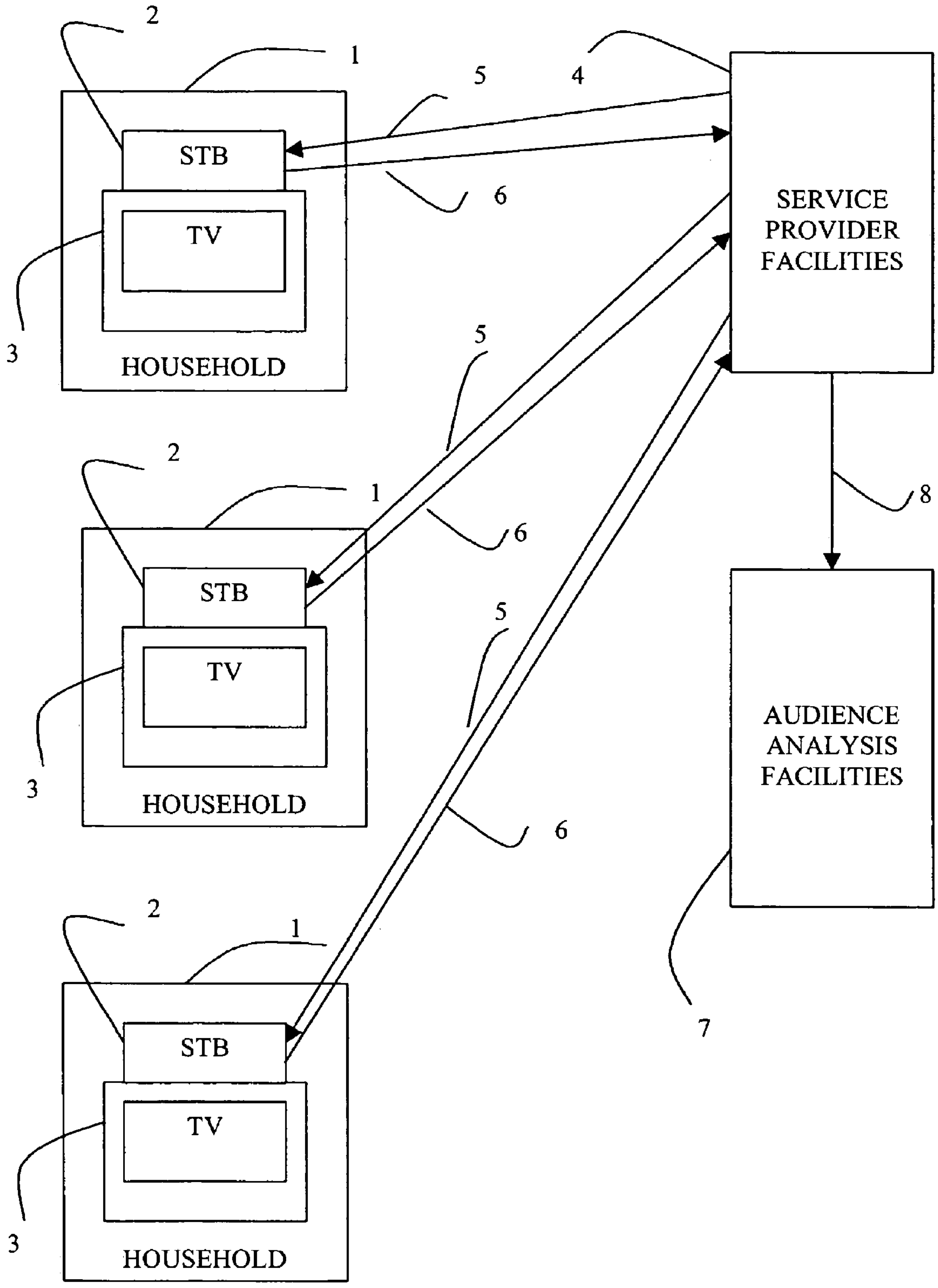
FIG. 1 schematically illustrates a system in which multi-channel program services, for reception via digital cable and/or satellite for example, are delivered to a households.

FIG. 1 schematically illustrates a system in which multichannel program services, for reception via digital cable and/or satellite for example, are delivered to a households which provide the audience which is to be analysed. In each household 1 there is provided a channel selector device, for example a so-called Set Top Box or STB 2, by means of which a particular program or channel of those available can be selected by individual members of the household 1 for presentation on a presentation device, for example a TV 3 in the household. Although FIG. 1 shows only three households 1 it will be understood that in reality very many households may be part of the system. The programs or channels available, in this case TV channels, are provided by a service provider or system operator to all these households from service provider facilities 4, those facilities for example comprising studios, base stations, uplink transmitters, central offices etc., and are delivered to the households by a delivery network providing signal transmission paths schematically indicated by arrow 5, which may be a cable-based or satellite-based transmission path for example.

Each channel selector device or STB 2 in the system is capable of returning information to the service provider facilities 4 via a return path, schematically indicated by arrow 6. This return path 6 is typically provided either via the "back channel" of the cable-based system or via a telephone line connection in the case of a satellite-based system, or any other suitable communication path. In particular, the channel selector device or STB 2 is capable of returning information or data indicating channels or programs selected by the STB 2 at different times.

This returned information can be employed for analysis of the audience represented by the households 1 concerned, and for this purpose may be passed on from the service provider facilities 4 to audience analysis facilities 7, as schematically indicated by arrow 8. Of course the facilities 7 may be co-located with or incorporated in the service provide facilities in some cases. It is alternatively possible in some cases that information may be returned, for example via telephone line communication, to the audience analysis facilities 7 rather than the service provider facilities 4.

The returned information from the channel selector device, i.e. the STB data, fundamentally indicates only the channels or programs selected at that device or STB over time, for example the time of each selection of a different channel. Incidentally, the returned information may be returned "live", i.e. as each different channel is selected, or perhaps more usually may be stored in the STB and returned intermittently, for instance via a telephone line, at intervals, for example once per day, depending upon the system concerned.

As indicated above, one issue is that the returned information or STB data does not reveal when the TV 3, to which the STB 2 is connected in a household 1, was switched on and off. It is known from experience that STBs 2 are very typically left on permanently, so at the end of a viewing session the TV 3 may be switched off but the STB 2 continues to be tuned to the last channel watched. This means that the STB data provides only a distorted indication in particular of the lengths of time for which selected channels are actually being presented to the audience members in a household, viewing the TV 3, the latter length-of-time information being the information needed for basic audience analysis.

Figure 2:
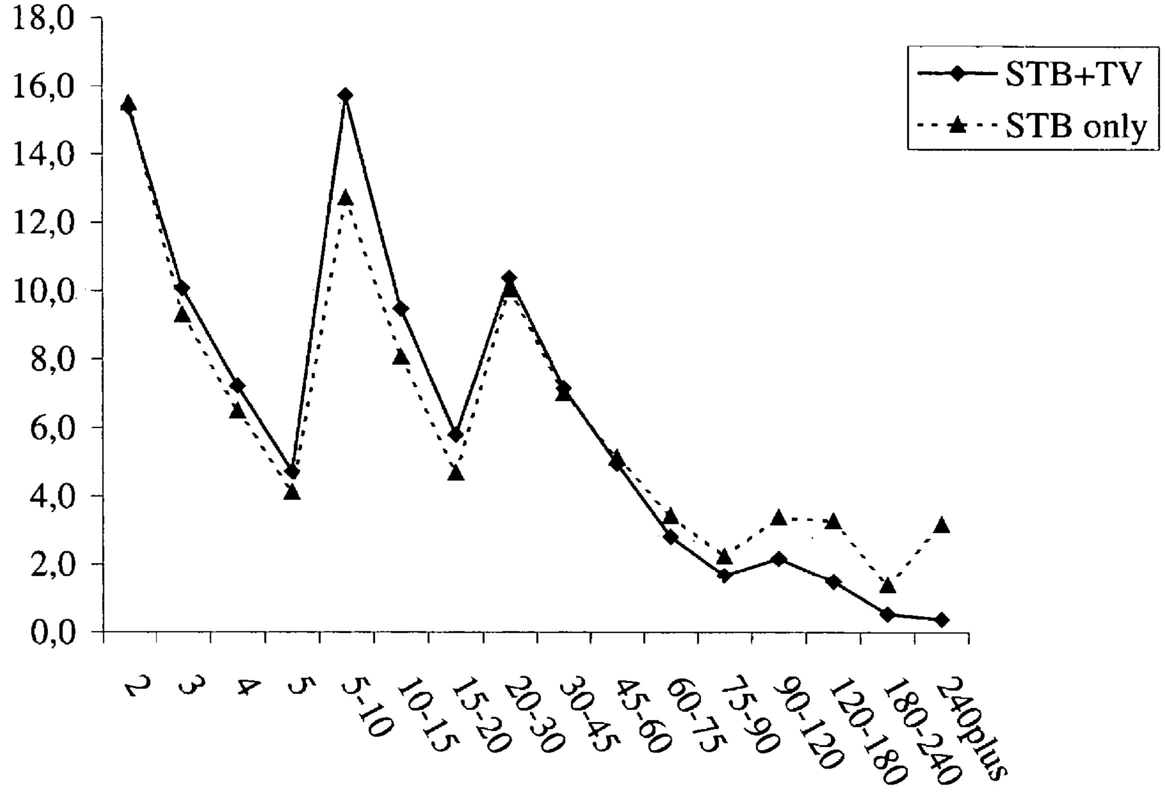
FIG. 2 is a graph illustrating the distribution of length of viewing sessions as determined on the basis of STB data alone and as determined on the basis of STB data and TV set data.

From studies carried out in the development of the present invention, it has been determined that most viewing sessions are in fact of quite short duration and very long sessions tuned to the same channel are comparatively rare occurrences. This is illustrated in FIG. 2, which merely by way of example shows the distribution of lengths of viewing sessions (viewing of any available channel) derived from a sample of 514 households viewing for one day.

In this study, in each of the 514 households 1, viewing was measured by monitoring both the STB 2 and TV set 3 itself. Thus, it was possible to compare differences in "viewing" as recorded by the STB alone (i.e. STB on, TV may be on or off) versus viewing defined by both the STB and TV set being on.

In summary the data collected indicated that:

1. The average viewing session (excluding very short sessions of under 2 min) measured by STB+TV is 22.4 minutes whereas for STB alone it is 40.4 minutes.
2. All of this difference is accounted for by the very long sessions For STB+TV only 9% of sessions last longer than an hour whereas STB alone has 17% sessions lasting for more than an hour. The difference is even more marked for sessions lasting longer than 3 hrs; less than 1% for STB+TV and 4.6% for STB alone.

Thus, whilst the number of very long viewing sessions is small, is has been found that they do have a profound effect on the average session length, to an extent that was not anticipated, and that this will in turn significantly affect analysis.

Figure 3:
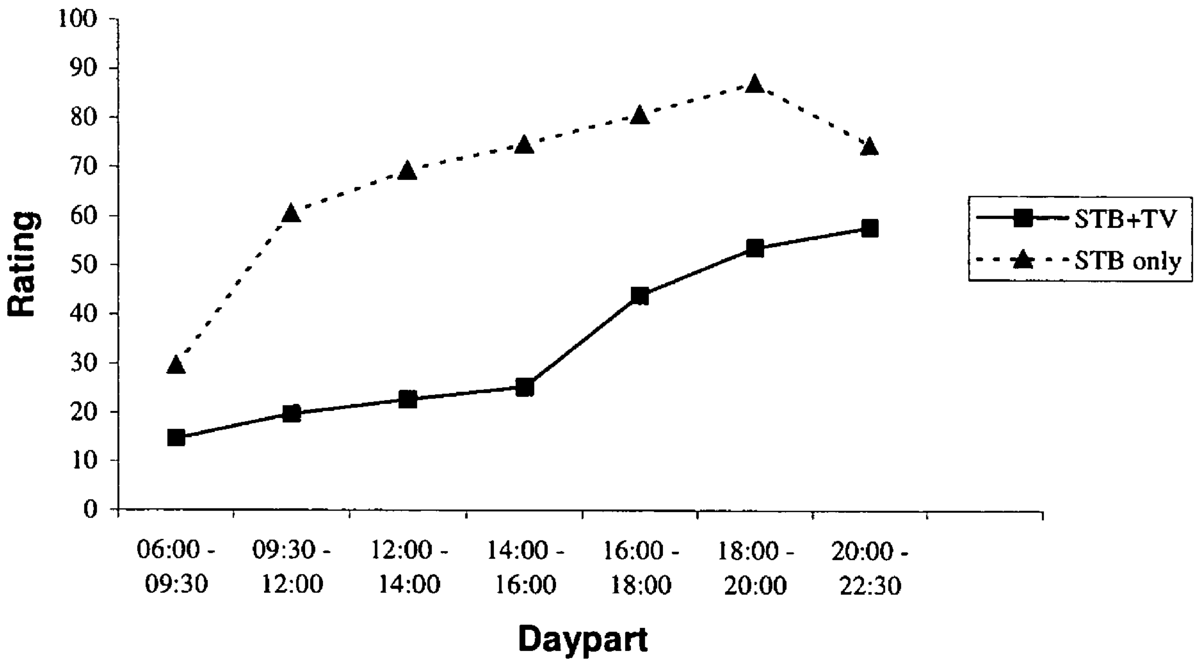
FIG. 3 is a graph illustrating assessed viewing rating by daypart as determined on the basis of STB data alone and as determined on the basis of STB data and TV set data.

This is illustrated in FIG. 3, which shows the average homes rating (viewing to all channels) by daypart (i.e. different periods of time over the course of a day as indicated in the Figure) calculated using STB+TV data versus that using only STB data. Because a number of households 1 leave their STB 2 switched on after they have turned the TV off 3 there is a sizeable discrepancy between the two.

The inventors of the present invention have had the insight that the problem presented by this can be overcome, at least to a great degree, by a method in which the "raw" STB data is modified or refined to enhance its value for audience analysis, and that this can be achieved without making provisions in the households for ensuring that switching off the TV set always causes the STB to be switched off, and without need for making provisions in the households for monitoring whether the TV set is on or off.

In accordance with a method embodying the present invention, the "raw" STB data is effectively edited in such a way that very long STB sessions are capped after a given interval. In other words, the method of the present invention provides that the TV will be assumed to have been turned off if the STB has been tuned to the same channel uninterrupted for more than the capped duration limit. Surprisingly, this procedure provides an effective way of dealing with the problem outlined above, removing a substantial part of the distortions caused by the problem and thus providing refined data which allows audience analysis to be more accurately carried out on the basis of STB data, rendering the product of the analysis more useful and commercially valuable.

Figure 4:
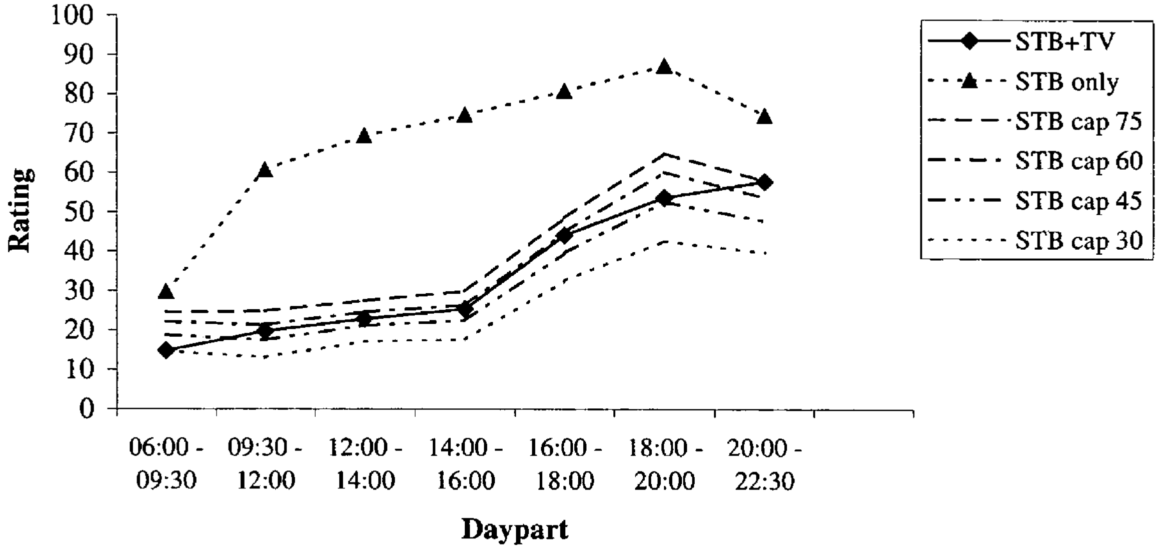
FIG. 4 is a graph illustrating how viewing rating by daypart as determined on the basis of STB data alone needs to be modified to provide a match with viewing rating as determined on the basis of STB data and TV set data.

The effect of using STB data editing rules in accordance with an embodiment of the present invention was tested for a variety of capping limits ranging from 75 minutes down to 30 minutes. The results are shown in FIG. 4.

From this Figure, it is clear that capping the excessive STB session lengths can radically improve the calculation of the homes rating. For example, a cap of 75 minutes gives perfect agreement between capped STB and STB+TV calculated homes ratings during the 20.00-22.30 daypart. A shorter capping limit of 30 minutes is required to match the STB+TV rating during breakfast time 6.00-9.30.

Based on just this one day of data, the session length capping limits for different dayparts which could be applied in accordance with the present invention would be:

| Daypart | Capping limit (mins) |
|---|---|
| 06.00-09.30 | 30 |
| 09.30-12.00 | 54 |
| 12.00-14.00 | 52 |
| 14.00-16.00 | 58 |
| 16.00-18.00 | 54 |
| 18.00-20.00 | 58 |
| 20.00-22.30 | 75 |
| 22.30-25.00 | N/A |

The analysis of data reported here shows that even relatively simple editing rules applied in accordance with the present invention to "long" viewing sessions will at least to a large extent successfully deal with the potential problem of "over-reporting" the household viewing using only the STB data.

Editing or capping in accordance with the invention can be developed beyond the simple rules indicated above to allow greater dimensionality and a greater degree of refinement. For example, in accordance with the present invention capping limits may be set which are based not only on, or vary not only with, daypart or time of day, but are also based on other parameters. For example, capping limits may be set taking into account the channel selected, or the channel group selected, and/or the day of the week.

Providing for the determination of capping limits in dependence upon a variety of parameters can allow for the capping procedure of the present invention to be easily adjusted in the light of new information, changes of audience behaviour, and different audience behaviours in connection with different types of service being provided to the audience concerned. For instance, the behaviour of the audience for radio channels or programs delivered a service provider may differ significantly from that of the audience for TV channels provided by the service provider.

In accordance with the present invention, what is in effect a capping "matrix" taking into account all the different parameters considered can be provided and be applied appropriately to yield an advantageous improvement in audience analysis based on STB data.

Figure 5:
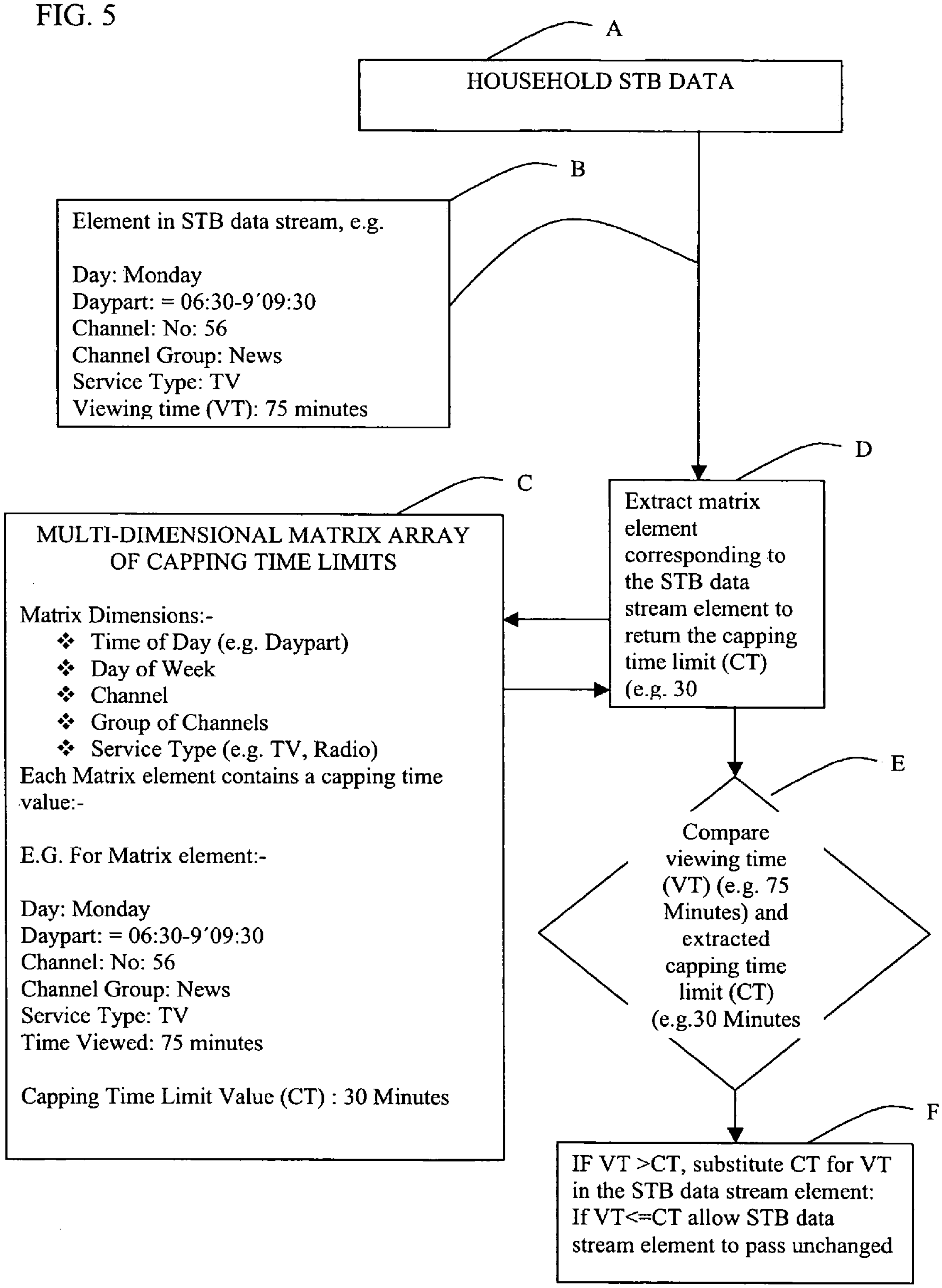
FIG. 5 schematically illustrates a capping operation in accordance with the present invention.

An example of this is schematically illustrated in FIG. 5, which shows that for household STB data A, each element B in the STB data stream is used effectively as a key to access a specific element of a multi-dimensional matrix C of capping time limits. Depending on the key information in the element B of the STB data stream (e.g. the particular day, daypart, channel (or channel group), and service type, an element of matrix C is extracted to yield a specific capping time limit CT, for example 30 minutes) to be applied to the element B in the STB data stream. Then, the viewing time VT indicated in the element B in the STB data stream (for example 75 minutes) is compared E with the capping time limit CT. If it is found F that VT>CT the element B is modified by substitution of CT (30 minutes) for the original VT (75 minutes), for subsequent audience analysis purposes. If, on the other hand, it is found that VT<=CT the element B is passed on unmodified for subsequent audience analysis purposes.

A method in accordance with the invention of applying capping limits to "raw" STB data of viewing sessions, in particular applying capping limits appropriately selected from a multi-dimensional matrix of capping limit values as outlined above, can yield information capable of useful, and hence valuable analysis. Further, although the volume of "raw" STB data presented by the households 1—of which there may be many thousands—may be massive, the method in accordance with the present invention can readily be applied, demanding resources in terms of computational power etc. which are well within the bounds of economic and technical realities.

Further, capping limits applied to STB audience analysis in accordance with the present invention can be refined and updated as necessary on the basis of reference information data obtained from other sources which do not rely, or do not rely entirely, on STB data, which can enable the variability of viewing session length in dependence upon each of the parameters considered to be determined and taken into account to provide greater audience analysis accuracy by means of the present invention. Such reference information may be obtained for example by de-constructing existing audience data from the other sources, to remove any individuals element present in that data, to replicate STB data (i.e. household data). One possible source of such reference data, at least in the United Kingdom, is BARB data (that is, data available from Broadcaster's Audience Research Board Ltd.). This reference data can be used to identify changes in audience behaviour relevant to the capping limits held in the matrix, arising for whatever reason. Alternatively, or in addition, reference data can be obtained using "SoSo" detectors as described below.

Further refinements to the capping procedure in accordance with the present invention are possible. For example it may be provided that recording of programs and later, time-shifted viewing of recorded programs is recognised. For example, for this purpose information on recording and later viewing may be obtained by monitoring the appropriate output/input (for example so-called Pin8 on a SCART output) of the STB.

STB data from a household fundamentally provides only household based audience information for analysis. In accordance with a further aspect of the present invention, however, it is provided that information relating to individuals viewing can be derived from the STB data, which data has preferably been subjected to capping in accordance with the present invention as indicated above, to provide individuals based audience estimates from the essentially household based STB data.

It has been realised that, at its simplest level, the viewing of individual members of a household can be attributed by employing Monte Carlo sampling techniques using a "probability of an individual's viewing" (PIV).

In this context, a probability of an individual's viewing (PIV) is a probability based on for example, daypart, channel and the demographic characterisation of the individual, derived on the basis of reference information obtained from a random selection of households, and thus individuals in the households, of known demographic character. This reference information is non-STB-based, or may be based in part in STB data enhanced with additional information, obtained for example using individual viewing tags as indicated in more detail below, which enables PIV's to be determined per daypart, channel and individual's demography. Thus, this probability can be derived from knowledge of individuals' viewing behaviours analysed by daypart or other time interval (e.g. for every quarter hour), channel(s) viewed, and the demographic characterisation of each individual concerned, for a random (Monte Carlo) selection or sample of all households (preferably of households having STBs belonging to the service providers' system). Given this reference information, household viewing data, that is STB data subjected to capping in accordance with the present invention as indicated above, can be resolved into estimates of viewing data for individuals or different demographic classes, effectively on the basis that the sub-set represented by the Monto Carlo selection of households, and hence the individuals in making up those households, is an indicator of individuals' behaviour in the set of all households providing the STB data.

If the only requirement is to produce individual audience ratings this relatively simple method will suffice.

That is, by associating with the STB data—for example an element of that data indicating specific values of:

Day
Daypart
Channel
(optionally) Channel Group
(optionally) Service Type (e.g. TV/Radio)
(Capped) Viewing time: VT/CT the PIV's derived from the reference information for that collection or set of specific values, a probability estimation can be made of the individuals (in terms of demographic class or group) likely to making up the audience on that day, for that daypart, for that channel etc, and for that viewing time. In effect, in accordance with the invention, the STB data can be reverse resolved into individual viewing information, on the basis of the PIV probabilities applicable to the STB data.

Figure 6:
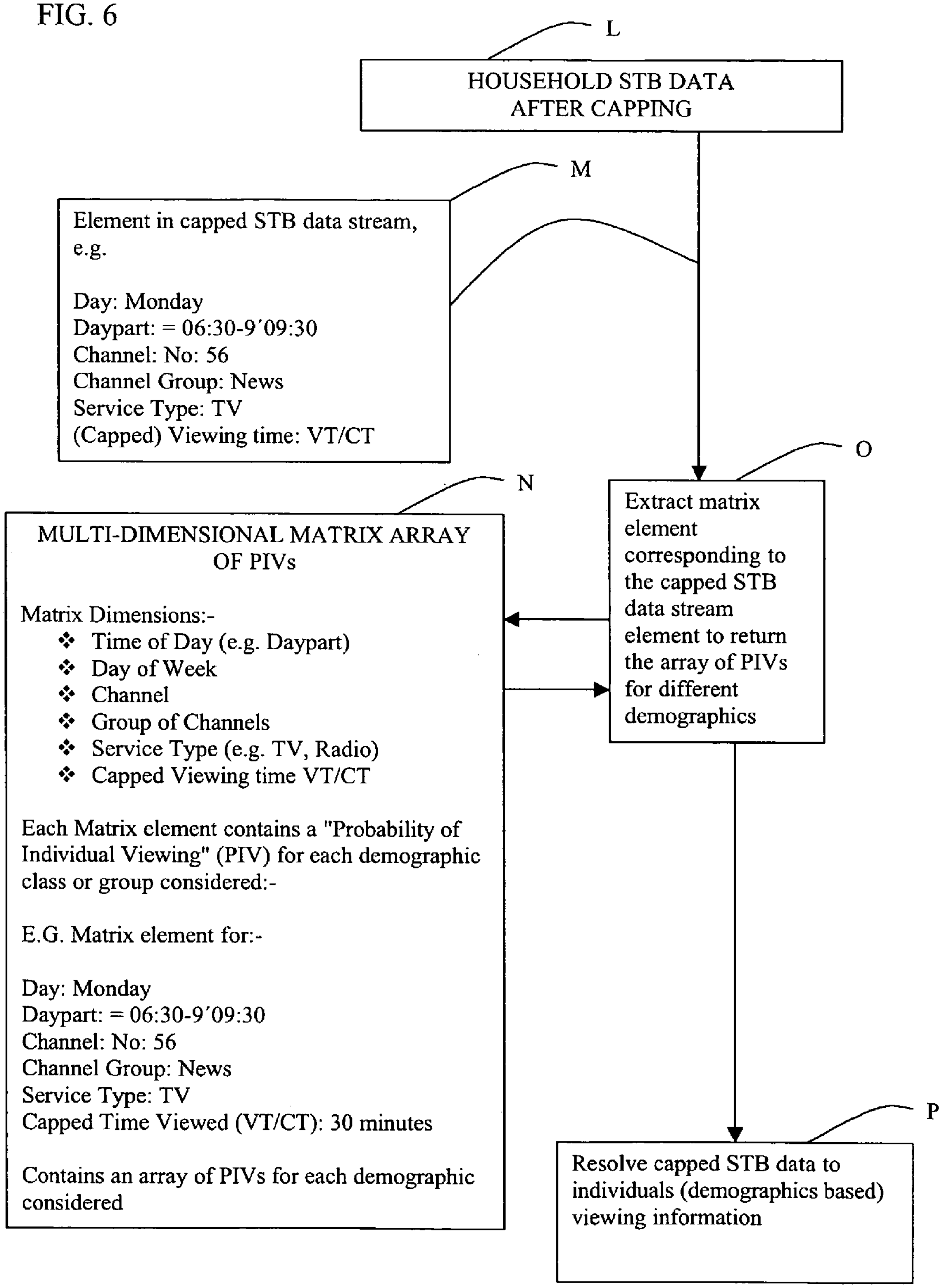
FIG. 6 schematically illustrates an operation in accordance with the invention for resolving STB data into estimates of individuals viewing, using a multi-dimensional PIV matrix.

This is illustrated in FIG. 6. There is provided a matrix array N each element of which contains an array of PIVs relating to each demographic class or group of interest for analysis of the relevant audience. The dimensions of the matrix are dimensions of the STB data provided. For example, as illustrated in FIG. 6, the dimensions of the STB data (i.e. the items of information held in each element of STB data) may be: (a) day (of week); (b) daypart (period of time in the course of the day), (c) channel selected, (d) (optionally) group of channels to which the selected channel belongs, (e) (optionally) service type (e.g. television or radio), and (f) viewing time (preferably viewing time after capping in accordance with the present invention as explained above). The dimensions of the matrix array are then the dimensions (a) to (f) as indicated. In principle, a matrix element is provided for each possible combination of values of these dimensions (values of each of these items of information). Each matrix element then contains an array of PIVs, for each of the demographic groups or classes of interest. This array of PIVs provides in effect an estimation of the audience makeup, in terms of numbers of individuals in each of the demographic classes of interest likely to have been viewing, for STB data elements having the specific values of the dimensions concerned (i.e. specific values of the items of information provided in the data elements).

Thus, as illustrated in FIG. 6, an element M of household STB data (preferably capped data) can be used as a key to the matrix N to extract O that matrix element which corresponds the to STB data (in terms of specific values of the matrix dimensions), to provide the array of PIVs for individuals of different demographic groups or classes. On the basis of the arrays of PIVs thus provided, the STB data can be resolved P into estimated viewing information for individuals of different demographic groups or classes.

Using this method, in accordance with the invention, STB data, which in principle provides only household viewing information, can be (reverse) resolved into individuals viewing information, providing an estimation of audience makeup in terms of demographic classes or groups, and thereby the value and utility of the audience analysis can be enhanced to a great degree.

Although the procedure outlined above can greatly enhance the value and utility of the information obtained from STBs, it has been realised that it is further desirable to provided more accurate estimates of individual audience reach, and that in this instance simple Monte Carlo methods alone will not be sufficient for obtaining the information needed to construct the necessary multi-dimensional PIV matrix. It has been realised that additional factors then need to be taken into account:

a) The probability that an individual is viewing at the beginning of any one viewing statement (e.g. period of time per channel or program) will in reality depend on whether the individual was already a viewer prior to the commencement of the statement. In other words an inheritance factor will be present.
b) Under methodology typically used for audience analysis, for example under BARB methodology, all reported household viewing has to be covered by at least one individual in the household being present. In other words, the TV set should not be on, playing to itself in an empty room; at least one audience member should be present.
c) The reference information available in practice may be insufficient to enable accurate PIVs to be provided for all possible specific combinations of values of the dimensions of the PIV matrix. For example, accurate PIVs may not be available for all channels for all times of day.

At least the first two factors mean that reference information provided on the basis of a simple Monte Carlo method would result in the reach (i.e. the numbers of individual viewers per demographic class or group, rather than viewing households) being exaggerated compared to what would be achieved using traditional people meter data. This problem can be dealt with as follows, in accordance with an aspect of the present invention.

The simple Monte Carlo method assumes, as indicated above, in effect, a matrix of PIV values which would vary, for example, only by daypart or quarter hour, by channel and by individual demographic.

In accordance with the present invention the matrix is provided in two forms: (a) a matrix of contemporary PIV values derived using contemporary, or as contemporary as possible (e.g. current day's) reference viewing data, such as BARB data mentioned above (b) default values which would be used when either the contemporaneous values were unreliable due to the reference information being derived only from low sample counts, or when reference information is unavailable.

In accordance with this refinement of the present invention, PIV values are refined to make them conditional on whether the individual was a viewer in the preceding quarter hour (or other preceding time period or daypart) or not.

Thus, in effect, two matrices (or, in other words, each matrix element contains two arrays) of conditional PIV values are defined in accordance with the present invention, on the basis of analysis of the reference information used for deriving the PIV values:

An Inherited PIV i.e. the probability that an individual is assigned as a viewer to the current statement (that is the current daypart or quarter hour, or other time period, and the current channel) given that the individual was a viewer to the statement immediately preceding it.

A New Viewer PIV i.e. the probability that an individual is assigned a viewer to the current statement given that the individual was not a viewer to the statement immediately preceding it (e.g. was not a viewer at all, or was viewing a different channel).

This latter probability will include situations when there is no statement immediately preceding (which will happen when the set is deemed to be first switched on).

Both these conditional probabilities need to be calculated, for example, quarter hour by quarter hour, on the basis of reference data using the following method:

i) Determine whether an individual was a viewer (to any channel) at any time in the previous quarter hour.

ii) For each channel (c) and demographic group (i) calculate separately for prior viewers and non-viewers (to the previous quarter hour, t−1) the sum of minutes viewed in the current quarter hour, t.

iii) For each prior viewer (i) calculate the number of minutes of set viewing in the home to channel (c) in the current quarter hour (t) and sum (Note: if there are two prior viewers of the same demographic group (i) in the household the set viewing is counted twice, once for each individual (note: the set viewing minutes should pick up the appropriate individual's demographic weight)

Similarly, calculate the total set viewing minutes for the current quarter hour for prior non viewers.

$$\text{Then conditional } PIV(c, i, t) = \frac{\text{Sum mins viewed } (c, t) \text{ by prior viewers } (i)}{\text{Sum set mins } (c, t) \text{ in the home of each prior viewer } (i)}$$

These conditional PIV's can be used in accordance with the present invention in place of the single PIV value employed in the simple Monte Carlo method.

Default PIV Values

The available reference data (e.g. BARB data) may be insufficient to specify reliably the conditional PIV's for each and every channel and demographic group, since a reasonable sample size is needed for reliability of the reference data. That is, reference data is needed from a reasonable number (e.g. 100) of households tuned.

In these instances, in accordance with the invention, default values are created by widening the definition of either the time window or the channel. For example, the current quarter hour can be widened to the current daypart and the channel definition widened to include a group of similar channels. This process can continue until a sufficiently large sample of households tuned has been accumulated in the reference data to calculate a reliable PIV. In substance, although the resolution or resolving power of the multi-dimensional PIV matrix might be considered to be reduced (as compared with an ideal in which reliable PIV's can be provided from reference data for each and every channel and demographic group), useful and valuable results cam still be obtained.

In this way, using the method illustrated in FIG. 6 for example, the STB data can be further analysed, using the conditional PIV values, into an estimates of individuals' viewing (by demographic class) which is an even more accurate reflection of reality. In this way the audience analysis information obtained from STB data is made even more useful and commercially valuable because it is resolved from merely household viewing information to highly accurate estimated individuals' viewing information.

Covered Viewing

In accordance with the present invention, the covered viewing issue (i.e. that there must be at least one member of a household viewing the TV) can also be taken into account. In accordance with an embodiment of the present invention, this is done by using a two stage sampling process:

Stage 1

Select one individual in each set viewing household to be a viewer (i.e. make sure the household is covered). This is achieved by sampling in proportion to each individual's conditional PIV.

Stage 2

Use a Monte Carlo method to decide if an individual who was not selected as a viewer at Stage 1 should be made a viewer.

The probabilities used in Stage 2 are the conditional PIV's modified to allow for the effect of forcing one person to be a viewer at Stage 1.

These modified probabilities (PIV*) can be estimated by the following formula:

$$PIV^* = \frac{PIV - P(1)_i}{1.0 - P(1)_i}$$

Where PIV=conditional PIV $P(1)_i$=average chance that an individual of this demographic group i will be selected at stage 1

$P(1)_i$ can be calculated from reference data (e.g. BARB data) for example for each demographic group for each quarter hour by the following method:

i) For all households containing an individual of a particular demographic group i, sum the total minutes of viewing of all individuals in those households (sum mins All)i.

(Note: if there are two individuals of demographic group (i) living in the same household, the all individuals viewing in that home is counted twice, once for each individual (i))

ii) Sum the viewing minutes of just the individuals belonging to the particular demographic group (Sum mins demog)i.

Then $$P(1)_i = \frac{(\text{Sum mins } demog)i}{(\text{Sum mins All})i}$$

In this context it is necessary to check for the condition PIV<P(1)$_I$ since a negative PIV does not make sense. If/when this arises (most likely for non-inherited PIV's) then either it is possible to set PIV*=0 or, if its occurrence is widespread and significant, it is possible to set PIV*=0 if PIV* as calculated is less than some small+ve value. (This limit being set in the light of the occurrences of PIV<P(1)$_i$).

As with capping, individuals viewing estimation in accordance with the present invention can be developed to allow increased dimensionality and greater accuracy of audience analysis.

Further, in accordance with the present invention, PIVs may be calculated for a range of demographic groups (possibly interlaced age/gender) to achieve the necessary balance between the accuracy of the individuals viewing estimation versus the availability of a sufficient reference sample data.

As mentioned above, one issue of significance when obtaining audience information from STBs is that the STB data does not reveal when the TV to which the STB is connected was switched on and off. STBs are very typically left on permanently, so at the end of a viewing session the TV may be switched off but the STB continues to be tuned to the last channel watched. In accordance with the present invention, this issue can be resolved by employing a capping procedure as described above.

However, to support that capping procedure (i.e. to allow for the determination of capping limits which are as accurate as possible for the audience concerned) it may be desirable to monitor the actual switching on and switching off of the TV set in at least a sample of the households providing the STB data employed in the present invention, to provide reference information as mentioned above.

In accordance with a further aspect of the present invention there is provided a simple-to-install, low-cost TV set-on/set-off detector (hereafter "SoSo" detector). This SoSo detector is provided to be connected in line with the mains electricity feed to the TV set—unplug the TV; plug in the SoSo; plug the TV into the SoSo.

The SoSo is capable of detecting the current or power supplied to the TV set and is capable of distinguishing between the power or current levels associated with the TV set in an "off" or "standby" state and in an "on" state.

SoSo detectors may, for example, thus be installed in a sample of the households in which the STBs are present and information provided by SoSo detectors, as to whether a TV set is on of off (or in a standby state) may be combined with STB data provided from the households involved in the sample, and may also be used to further refined capping limits as applied to other households with STBs but no SoSo detector.

In accordance with embodiments of this aspect of the invention, three basic variants of the SoSo detector are provided, though it will be understood that the features of these individual variants may be combined with one another to produce yet more variants. In accordance with these embodiments of this aspect of the invention, all variants determine whether the TV set is on by measuring the current it draws from the mains supply. They vary in the means by which the data are returned to the system operator for analysis:

SoSo Detector With Clock and Data Store

Figure 7:
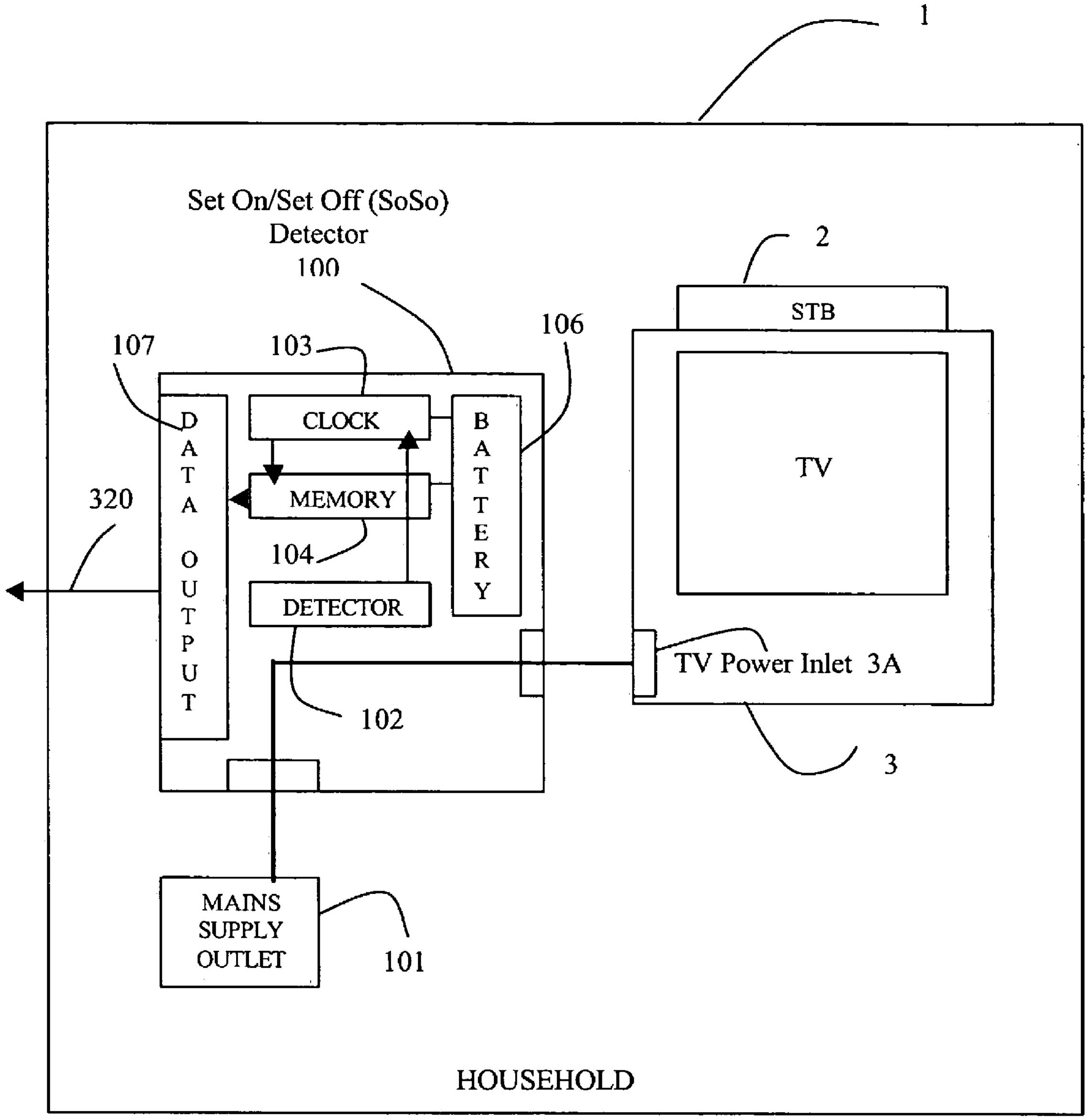
FIG. 7 schematically illustrates a form of Set on/Set off (SoSo) detector which may be employed in accordance with the present invention.

In accordance with this variant embodiment as illustrated in FIG. 7, the SoSo detector 100 is intended to be installed in a household 1 for a limited time—perhaps a week—before being returned to the system operator for analysis. As illustrated in FIG. 7, the SoSo detector 100 is arranged along the power supply path, indicated by a thickened line, from a mains supply outlet 101 in the household 1 to the power inlet 3A of the TV 3. The SoSo detector is powered from the mains supply outlet 101 when it is in place in the power supply path. The SoSo detector 100 includes for example a current detector 102 which is capable of detecting the level of current flowing in the power supply path. The design and structure of such mains current detectors are well know to persons skilled in the art. The SoSo detector 100 further contains a clock 103 and a non-volatile memory 104, possibly supported by a battery 106, allowing time-stamped records of when the TV was switched on and off to be produced and stored in the memory 104 even when the SoSo detector is not being supplied with power from the mains. This information can be retrieved from the memory 104, via a data output port 107, for analysis once the SoSo detector 100 is returned to the system operator. Alternatively, the data output port of the SoSo detector 100 may output data to the system operator via a telephone line 320, as schematically illustrated, or some other suitable communications path. The memory 104 of the SoSo detector may then be cleared and made ready to record further information.

With the reference information from returned SoSo detectors the multi-dimensional capping matrix can if necessary be re-calibrated (i.e. new updated values of capping time limits set) and applied to the STB data from the period to which the SoSo detector information relates, to provide a refined audience analysis for that period, and/or applied to the current STB data flow in place of earlier matrix values.

SoSo Detector With Remote Control Transmitter

Figure 8:
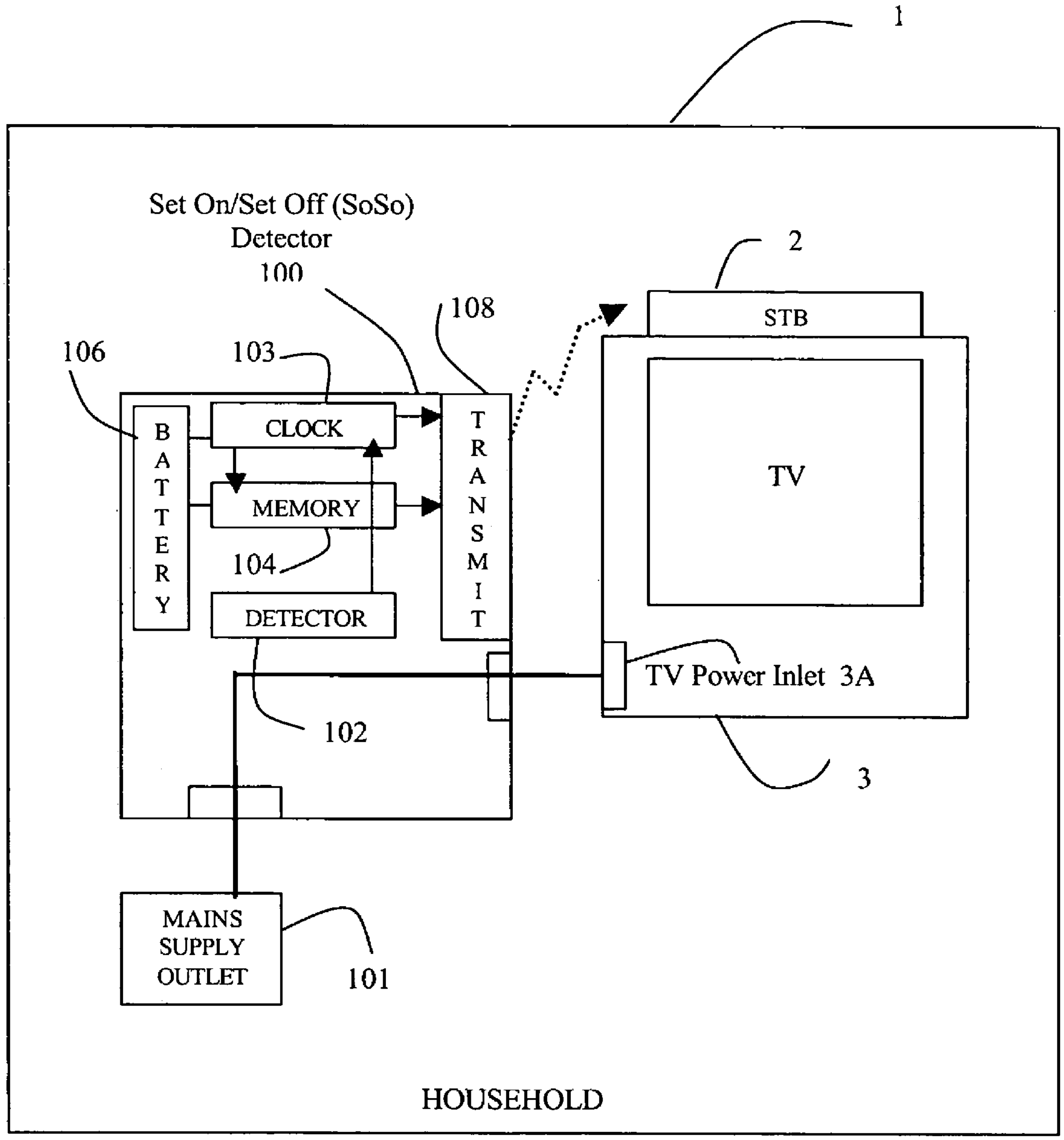
FIG. 8 schematically illustrates a modified form of Set on/Set off (SoSo) detector which may be employed in accordance with the present invention.

This variant of the SoSo detector 100 is illustrated in FIG. 8. This SoSo detector may be installed in the household 1 for an indefinite period. The detector 100 utilises the return path or back channel of the STB 2 associated with the TV 3 to return its "TV set on"/"TV set off (or on standby)" data. This is achieved by making use of unused remote control commands that the STB 2 can receive but does not act upon. That is, the SoSo detector 100 is equipped with a transmitter 108 which is able to transmit remote control commands (schematically illustrated by the dotted line arrow in FIG. 8) to the STB 2, when the SoSo detector 100 detects switching on or switching off (or switching to standby) of the TV set 3. In this case STB application software is programmed in a suitable manner to recognise the remote control commands as "TV On" and "TV Off" and the resulting data can be returned along the STBs return path or back channel along with the STB tuning data.

The SoSo detector 100 may transmit the remote control commands as switching on and/or switching off (or switching to standby) of the TV is detected, in which case the memory 104 illustrated in FIG. 8 may be omitted, as may the clock 103, since the reception of remote control commands from the SoSo detector 100 may be time-stamped, on receipt, in the STB 2. With this variant of the SoSo detector 100 the battery 106 may also be omitted.

In view of the fact that most STBs are controlled by a remote control of some kind (e.g. operating with for example infrared or possibly ultrasonic signals, or possibly radio signals) this variant exploits a capability which generally pre-exists in the STBs; that is, most STBs can recognise a larger number of remote control commands, for instance 64 commands, than are employed for normal operation of the STBs (for example for channel selection, volume control etc.).

The provision of SoSo detector data along with the STB tuning data, at least from a reference sample of households, has the advantage that multi-dimensional capping matrix can, if necessary be re-calibrated (i.e. new updated values of capping time limits set) continuously or at frequent intervals, to provide for refined capping time limit matrix values.

SoSo Detector Used With a "Tag" Carried by an Individual Viewer

Figure 9:
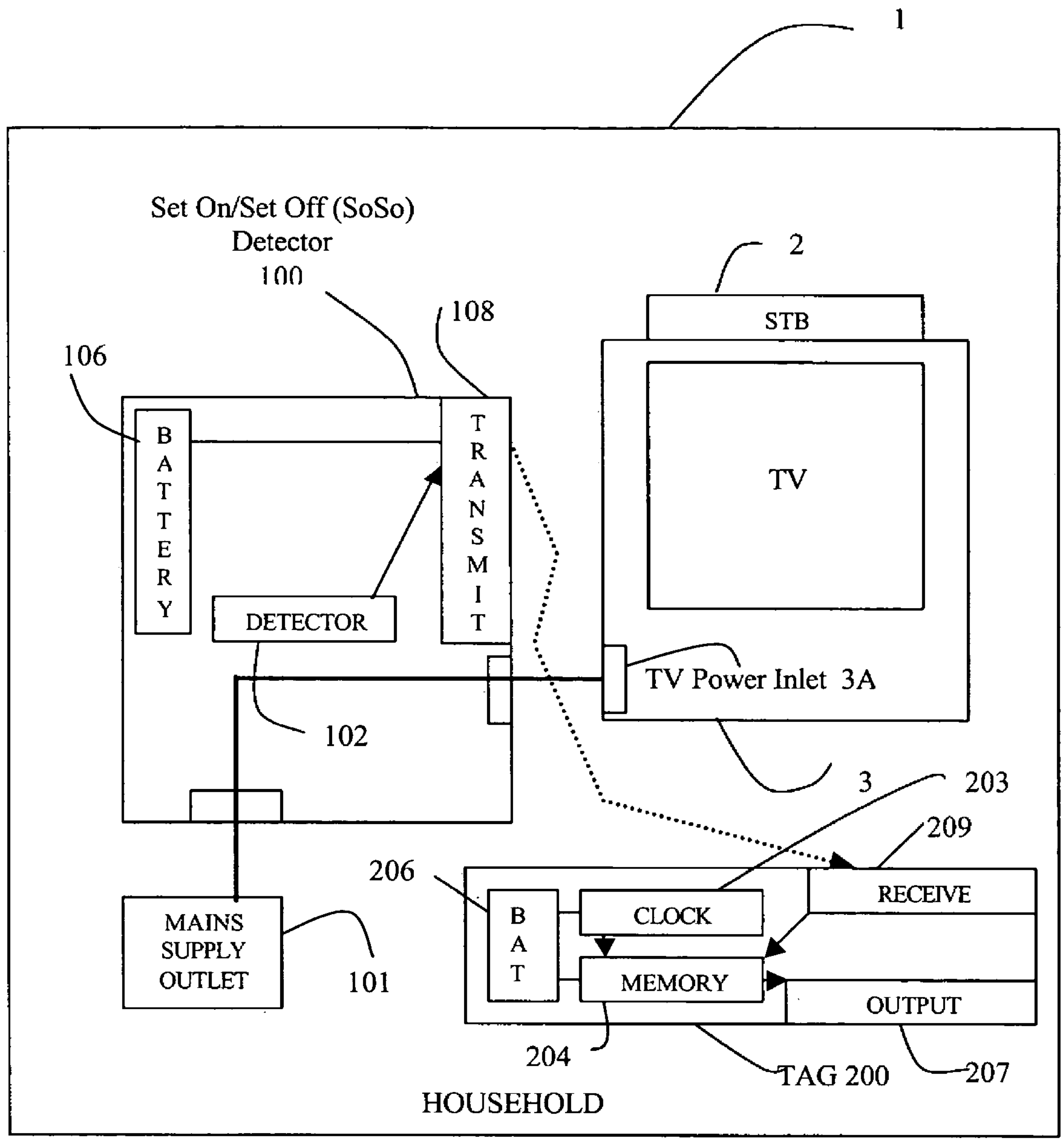
FIG. 9 schematically illustrates a form of Set on/Set off (SoSo) detector and individual viewer tag system which may be employed in accordance with the present invention.

In this variant, which is illustrated in FIG. 9, a tag 200 is carried by an individual viewer in the household 1.

As in the variant of FIG. 8, the SoSo detector 100 comprises a transmitter 108 which transmits (continuously or periodically), in this case to any tag 200 present in the room, its own identity (and hence, from knowledge of where it was installed, location) and the fact that the associated TV is switched on. Here, as in the variant of FIG. 8, ultrasonic signals and perhaps infrared signals (schematically illustrated by the dotted line arrow in FIG. 9) may be used with advantage as, unlike many radio signals, they do not readily travel through walls, thus ensuring that the receiving tag 200 is indeed in the same room as the SoSo detector 100 and hence TV 3. In this variant, memory and clock may be omitted from the SoSo detector 100, as illustrated.

The tag 200 includes a receiver 209, for receiving the signals transmitted by the SoSo detector 100, and further includes a clock 203 and a non-volatile memory 204 for providing and storing time-stamped records of when signals are received from the SoSo detector 100 indicating that the TV set has been switched on and/or switched off (or switched to standby). The tag also includes a battery 206 for powering the other components of the tag.

Thus, in this variant, the tag 200 is responsible for returning the "TV on" (whilst the tag is present in the same room as the SoSo detector) data, and for this purpose has an output port 207 via which the stored data can be retrieved.

Whether this variant of is installed in the household 1 for a short period only, or indefinitely, is determined by the means by which the data from the tag 200 are returned to the system operator. For example, the tag may be physically returned to the system operator, for instance by mail, after a period of use in the household, for example one or two weeks. Alternatively, provision may be made for data to be downloaded from the tag 200 at intervals by means of a docking station (see the description of FIG. 11 below) provided in the household 1, which can then transmit the data, for example via a telephone line, to the system operator, and clear the tag memory 204 to make the tag ready for further use in the household.

When physical return to the system provider is adopted, the tag or tags used in a household may be returned to the system provider together with the SoSo detector or detectors used. The system operator can then download the stored information and clear the tag(s) and detector(s) for use again, possibly in a different household. In this way, by sending tag(s) and detector(s) each time to different households, data relating to a much greater spread of demographics and minority channel viewers can be accumulated than would be affordable with a traditional static panel of households.

As the "tag" variant described immediately above cannot record periods when the TV 3 is on but no tag 200 is actually present in the room in which the TV is located, it only gives complete data on TV usage if all members of the household carry tags. If this is not possible then the SoSo detector 100 may be fitted with one of the other data retrieval mechanisms mentioned above in addition to its transmitter for sending signals to tags; either clock and internal memory storage or remote-control transmission to the STB. This approach ensures full TV on/off information is available even for periods when tag-carrying household members are not present in the room with the TV.

On the other hand, if all members of the household carry tags, this tag variant overcomes the "covered viewing" issue, ensuring that the TV 3 is only indicated to be on when at least one viewer is present.

Figure 11:
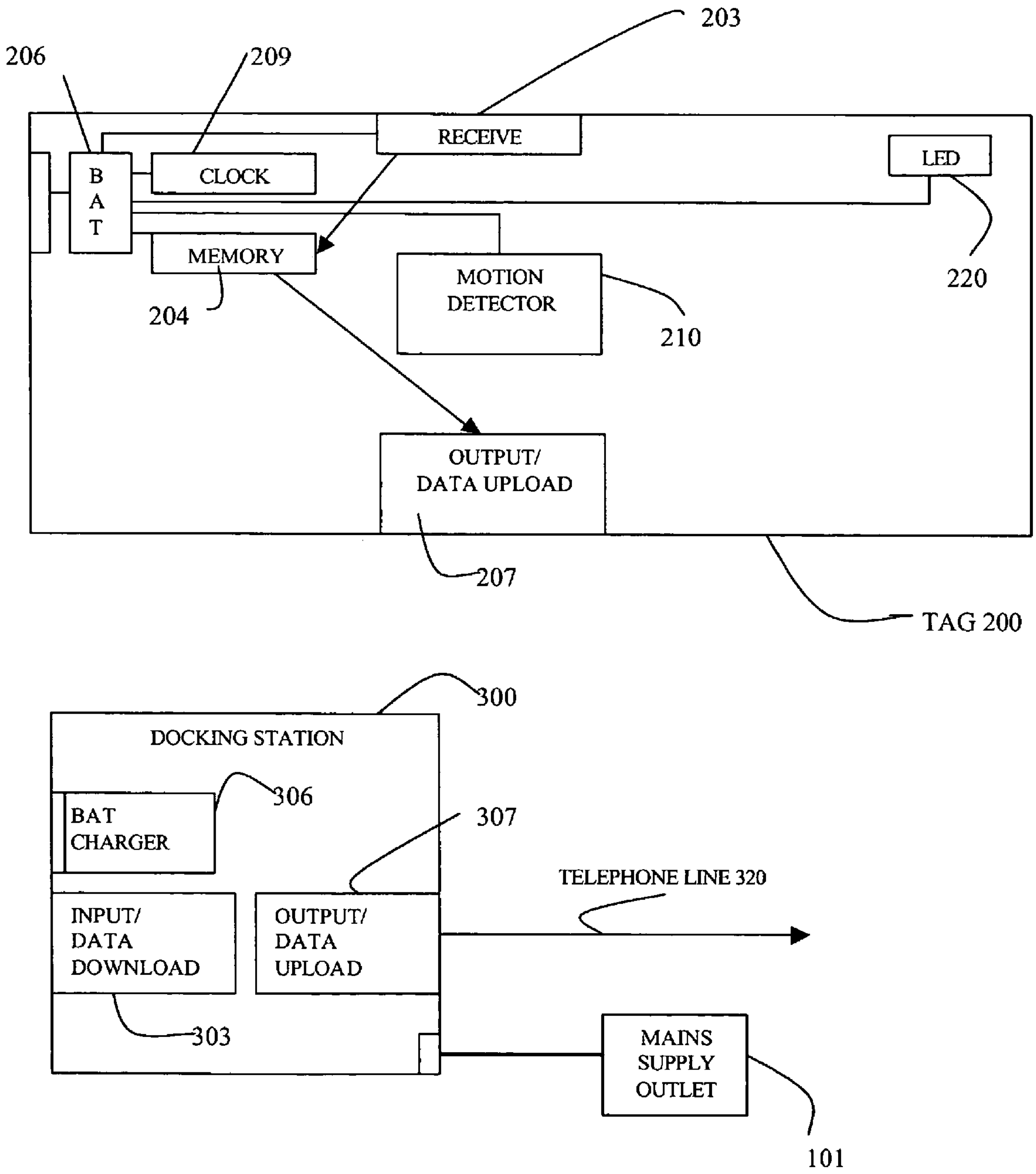
FIG. 11 schematically illustrates an embodiment of individual viewer tag which may be employed in accordance with the present invention, and schematically illustrates a docking station for the tag.

An example of the configuration of an individual view tag 200 is illustrated in more detail in FIG. 11.

As will be understood from the above description, the primary purpose of the individual viewer tag 200 is to measure an individual's exposure to television within the household, primarily to complement tuning data obtained via the return path of an STB as discussed above. For example given knowledge of the demographics of each individual in a household, and assuming that each individual has a tag, there is provided at least for a sample of households a source of reference information that can be used to update PIV values for interpretation of STB data.

As will also be understood from the above description, there are two components to the in-home individual viewer tag system:

- A transmitter associated with each TV in the household. This transmitter is, for example, an ultrasonic SoSo detector 100 as described above.
- A portable receiver (the tag), for example an ultrasonic receiver, carried by each person to be monitored.

The transmitter or SoSo detector 100 may be mains powered; the TV is plugged in via the transmitter, as explained above. The battery 106, if present, then provides a back-up power source for other components of the detector 100, for instance a memory containing transmitter or detector ID information. The transmitter is only active when the TV is on, rather than off or in a standby condition, as determined for example by sensing mains current, by means of a mains current detector 102 as explained above, and simply transmits its own identity, to distinguish it from other transmitters in the same household.

The receiver or tag 200 is always active, recording which transmitter is within range and when that transmitter receives is active.

Preferably, the receiver or tag 200 contains a motion detector 210, as illustrated in FIG. 11, and will record when it is being carried by a person to be monitored. It may also have an indicator, such as an LED 220 that will flash occasionally, to confirm that it is working. The case of the receiver or tag 200 may be colour coded, or coded in some other way, so that it can be readily associated with the person who is to be monitored by the receiver or tag concerned, to whom that particular receiver or tag is assigned.

Unlike most radio transmissions, ultrasonic sounds, for example, will not pass through walls. Thus a system based on such non-wall-penetrating signals will accurately record presence of the person carrying the tag in the room with the TV on.

The system may be self-installed by a member of the household 1 concerned, requiring only that each TV 3 be unplugged and plugged in again via a transmitter or SoSo detector 100. The transmitters 100 may also be colour-coded and each allocated to a specific room, as determined during the process of recruitment of the household concerned to the sample panel.

For example, the system may be intended for weekly or fortnightly sweeps, generally as indicated above for the first SoSo detector variant, the receiver or tag having a rechargeable battery 206 with capacity for 15 days operation plus, mail-out (upload) and mail-back times.

Alternatively a docking station 300, which may be mains powered, as illustrated in FIG. 11, could be provided for charging the battery of the tag, by means of a battery charger 306, and data retrieval. For data retrieval, the docking station may comprise an input port 303 for downloading data from a tag 200 docked with the station, and a output port 307 for uploading data to the system provider, for example via a telephone line 320. This can provide, for example, overnight data upload to the system operator in panel-based (sample set of households providing reference information) operations.

Figure 10:
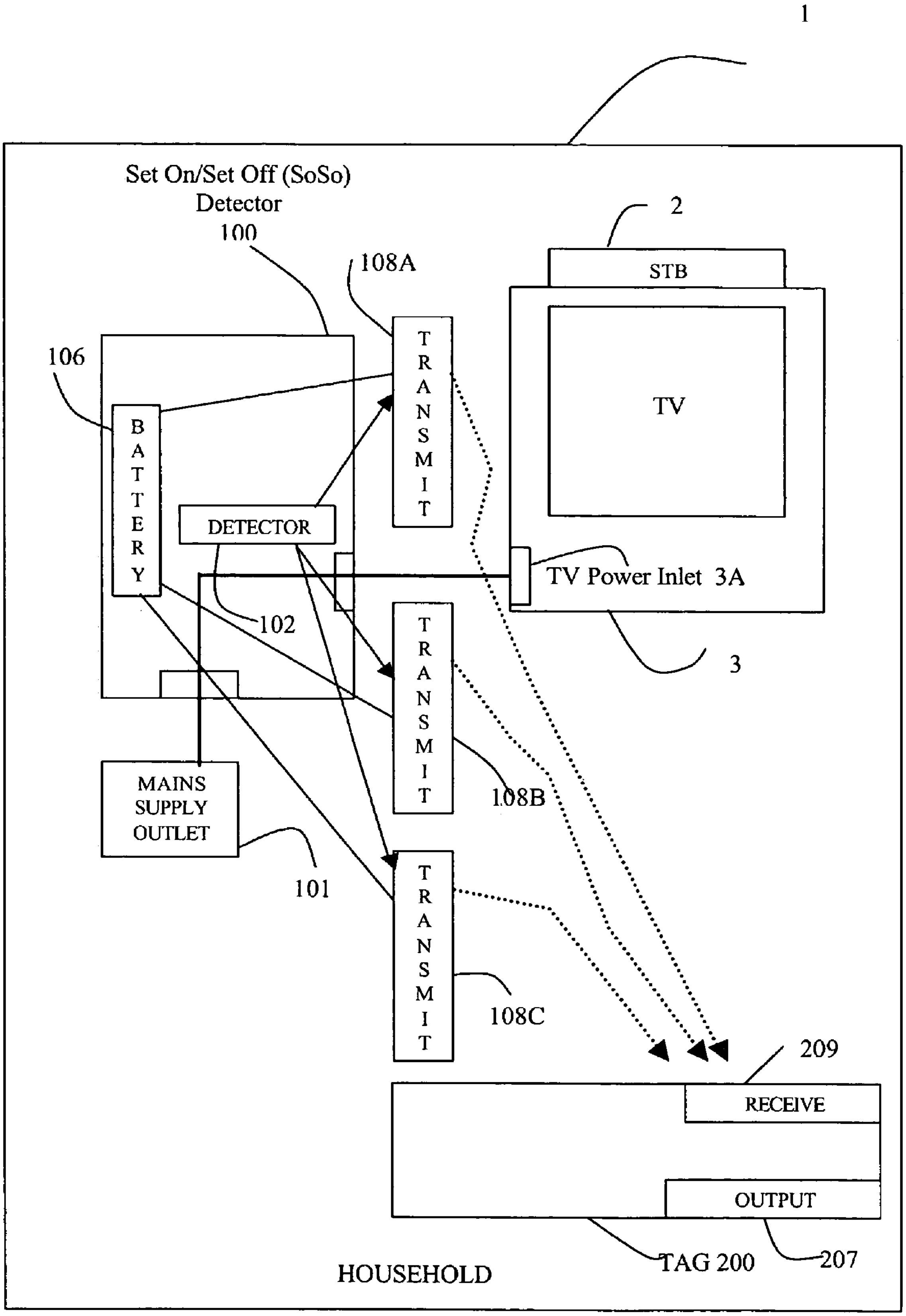
FIG. 10 schematically illustrates a further form of Set on/Set off (SoSo) detector and individual viewer tag system which may be employed in accordance with the present invention.

In a preferred configuration of the SoSo detector 100 and tag 200 system, operating on the basis of ultrasonic signaling, to mitigate possible problems with standing waves in the room in which a TV 3 is located, as schematically illustrated in FIG. 10 three ultrasonic transducers or individual transmitters 108A, 108B, 108C may be used, pointing in orthogonal directions and spaced n+½ wavelengths apart. They are used one at a time to transmit the same signal. The result is that a receiver or tag 200 cannot be in a null for the signals as transmitted by all three transmitters, so at least one transmitted signal should safely reach the receiver 209 in the tag 200.

Frequency modulation, amplitude modulation or phase modulation may be used, for example, for the transmitted signal. It may be necessary, since the tags may be in motion when signals are received, to take account of possible Doppler effects.

By way of example nominal transmission ultrasound frequency may be 40 kHz, to allow the use of commonly-available low-cost transducers.

Preferably the receiver 209 is a superheterodyne receiver, down-converting from 40 kHz at a microphone provided in the receiver detecting the ultrasonic signal to an IF of 256 Hz. Passive LC filters may be used for the RF (input frequency) and IF stages, followed by a digital IF filter and demodulation, for example in software. It has been found that such a configuration can affords an good performance/battery power consumption compromise for the tag 200.

Figure 12:
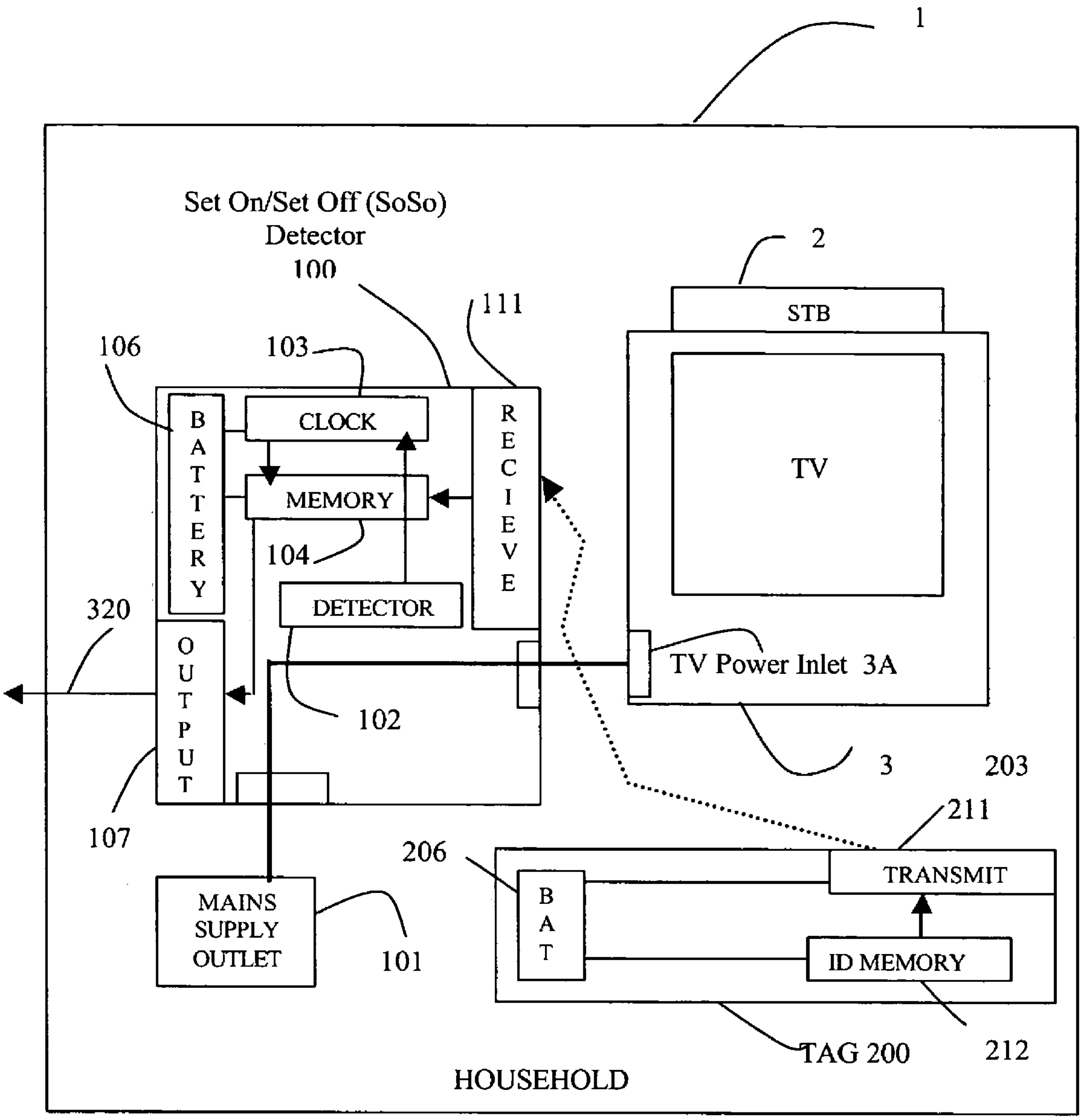
FIG. 12 schematically illustrates an alternative form of Set on/Set off (SoSo) detector and individual viewer tag system which may be employed in accordance with the present invention.

FIG. 12 illustrates an alternative form of Set on/Set off (SoSo) detector and individual viewer tag system in accordance with the present invention.

In this alternative, the SoSo detector 100 records "Set on/Setoff) information, for example as is the case for the variant illustrated in FIG. 7.

In this alternative, however, the tag 200 for example includes a transmitter 211, an ID memory 212 for holding a distinctive tag identifier, and battery 206 for powering the transmitter and operating the ID memory 212. The transmitter 211 transmits the tag identifier, from the ID memory 212, for example as an ultrasonic signal.

In this alternative, the SoSo detector 100 includes a receiver 111 for receiving signals, and thus tag identifiers, from any tag 200 in range. The SoSo detector 100 records information relating to received tag identifiers, for example in the memory 104, together with time stamps (from the clock 103) for the received identifiers. For example, the SoSo detector 100 may "listen" for tag identifier signals at predetermined intervals of time, and store for each listening time the identifiers of any tags in range, thereby to accumulate a detailed record over time of individuals, carrying or wearing tags, viewing the TV 3.

The tag information stored in the SoSo detector 100 can then be returned to the system operator along with the "set On" information also recorded in the detector 100. The return of tag information may involve physical return of the SoSo detector to the system operator, the information content of the SoSo detector being read via data output port 107. Alternatively, the data output port of the SoSo detector 100 may output data to the system operator via a telephone line 320, as schematically illustrated. The memory 104 of the SoSo detector may then be cleared and made ready to record further information.

In this alternative the functionality of a tag can be reduced to simple transmission of a tag identifier, which can enable tags to be produced more economically. Further, using a non-rechargeable battery 206 in the tag, thereby avoiding the need to provide for battery recharging, it may be possible to provide a sufficiently long tag lifetime that the tag can be disposed of when the battery is spent.

In the above description of SoSo detectors, reference has been made to detection of mains current to determine whether the TV set is on or off. In accordance with the present invention other possibilities are available for detecting whether the set is on or off. For example, the radiation (e.g. 15,625 Hz) associated with line scanning in the TV set may be detected, to determine whether the set is on. Other alternatives are also conceivable, such as screen brightness sensors. In accordance with the present invention, detection of any form of on/off indicating parameter for the TV set may be adopted.

In accordance with the invention there can be provided a system comprising:

a service provider facility which is a source of multiple selectable channels. The channels may be, for example, TV or radio channels;

a delivery network operable to deliver the channels to a multiplicity of households comprising individual members of the audience for the channels. The delivery network may be, for example, a digital transmission network which is satellite and/or cable based and/or based on terrestrial broadcasting;

in each household a channel selector device such as an STB operable by any of the individual members of the audience in the household to select from time to time one channel from amongst the delivered channels, and a presentation device, such as a TV, operable to present the selected channel to the household, the channel selector device providing data indicating which channels are selected and the lengths of time for which selected channels remain selected, each household having a return channel operable to return said data to an audience monitoring facility. The return channel may for example be the back channel of a cable based delivery network or be provided by telephone communication or alternative communication such as ADSL or SDSL, based on packet switching technology and/or internet protocols. Any available form of communications may provide the return channel. The data may be returned to the audience monitoring facility via the service provider facility.

the audience monitoring facility including a data processor operable to subject said data from each of the multiplicity of households to a procedure in which information in said data relating to the lengths of time for which channels remain selected is subjected to capping, whereby the indicated length of time for which a channel remains selected is reduced to a capped maximum permitted length if the indicated length of time exceeds the maximum permitted length, to provide capped data. The data processor is typically provided by suitably programmed computer facilities. Respective capped maximum permitted lengths of time may be provided for each selectable channel, or possibly for respective groups of selectable channels, so that different capped maximum permitted lengths can be applied to data relating to different channels or different channel groups. Further, respective capped maximum permitted lengths of time may be provided for each selectable channel or channel group for different time of day periods and/or different days of the week, so that different capped maximum permitted lengths can be applied to data relating to different time of day period and/or days of the week;

the data processor being further operable to employ the capped data to select, in dependence upon the indication of the channel selected and length of time for which the channel is selected, an array of probabilities of individuals exposure (PIVs) to the presentation of the channel on a presentation device, for individuals of different demographies, whereby the data provided by the channel selector device can be resolved into data estimating the likelihood of individuals of different demographies participating in the audience.

The system advantageously provides for the generation of reference information which is the basis for the capped maximum permitted lengths of time and the arrays of PIVs. For this, there may be provided:

in each one of a sample of the multiplicity of households, a detector operable to detect whether a presentation device, such as a TV set, in the household is on and operative to present a channel selected for presentation thereon by the channel selector device, such as an STB, in the household, and to provide data indicating when the presentation device is on. This detector may be a SoSo detector which detects mains current supplied to the TV set;

and a reference information generator, typically in the audience monitoring facility, operable to generate indications of differences between measurements of lengths of time for which channels are selected as provided by the channel selector devices and measurements of lengths of time for which the presentation devices are on and operative to present the channels, as provided by the detectors in the sample households, whereby periods of time for which channels are selected by the channel selector devices but the presentation devices are off and not operative to present channels can be determined, and said capped maximum permitted length determined therefrom.

In a preferred such a system, the detector in each of the sample households comprises a transmitter operable to transmit the data indicating when the presentation device is on, and the system further comprises:

in each of the sample households, audience participation recognition devices capable of being carried by the individuals in the household concerned, each recognition device having a receiver operable to receive said data indicating when the presentation device is on, transmitted by the detector device, when the recognition device is in range of data transmitted by the detector device, and thereby to generate audience participation indications when the individual concerned is an audience member for the presentation device concerned, transfer facilities, in each one of said sample of the multiplicity of households, operable to transfer said audience participation indications to said reference information generator, the reference information generator is also operable to derive the PIV's in the array from said audience participation indications, relating to the individuals in each of the sample of households and their probabilities of participation in audiences for respective selectable channels and for respective lengths of time in terms of the different demographies of the individuals concerned, the PIV's taking into account the dependence of the probability of an individual of participating an audience for a channel in one time of day period upon whether or not the individual was participating in the audience for the same channel in the preceding time of day period.

This disclosure is illustrative and not limiting: further modifications will be apparent to those skilled in the art and are intended to fall within the scope of the appended claims.

The invention claimed is:

1. A method of analysis of the audience for channels selectable by a channel selector device for presentation on a presentation device, the channel selector device providing data to a data processor indicating which channels are selected and the lengths of time for which selected channels remain selected, the method comprising:

subjecting the data relating to the lengths of time for which channels remain selected to a capping procedure, whereby the indicated length of time for which a channel remains selected is reduced to a capped maximum permitted length of time if the indicated length of time exceeds the maximum permitted length, to provide capped data;

wherein respective capped maximum permitted lengths of time are provided for respective selectable channels, so that different capped maximum permitted lengths are applied to data relating to different channels, and wherein respective capped maximum permitted lengths of time are provided for respective time of day periods at which a channel is selected, so that different capped maximum permitted lengths are applied to data relating to channels selected in different time of day periods, and wherein respective capped maximum permitted lengths of time are provided for respective days of the week on which a channel is selected, so that different capped maximum permitted lengths can be applied to data relating to channels selected on different days of the week.

2. A method as claimed in claim 1, further comprising:

employing the capped data to select, in dependence upon the indication of the channel selected and length of time for which the channel is selected, an array of probabilities of individuals' exposure (PIVs) to the presentation of the channel on a presentation device, for individuals of different demographies, whereby the data can be resolved into data estimating the likelihood of individuals of different demographies participating in the audience;

wherein the PIVs in the array are derived from reference information indicating, for samples of individuals of the different demographics, their probabilities of participation in audiences for respective selectable channels and for respective lengths of time;

wherein the data is employed to select the array of PIVs in dependence upon an additional parameter applicable to the data, beyond the channel selected and the length of time, the additional parameter being a time of day period to which the data relates, and wherein the data is employed to select the array of PIVs in dependence upon further parameter applicable to the data, beyond the channel selected and the length of time, the additional parameter being the day of the week to which the data relates.

* * * * *